June 20, 1961  D. J. CASH  2,988,936
PRESSURE WELDING APPARATUS
Filed March 19, 1958  3 Sheets-Sheet 1

INVENTOR.
DAVID J. CASH
BY
ATTORNEY

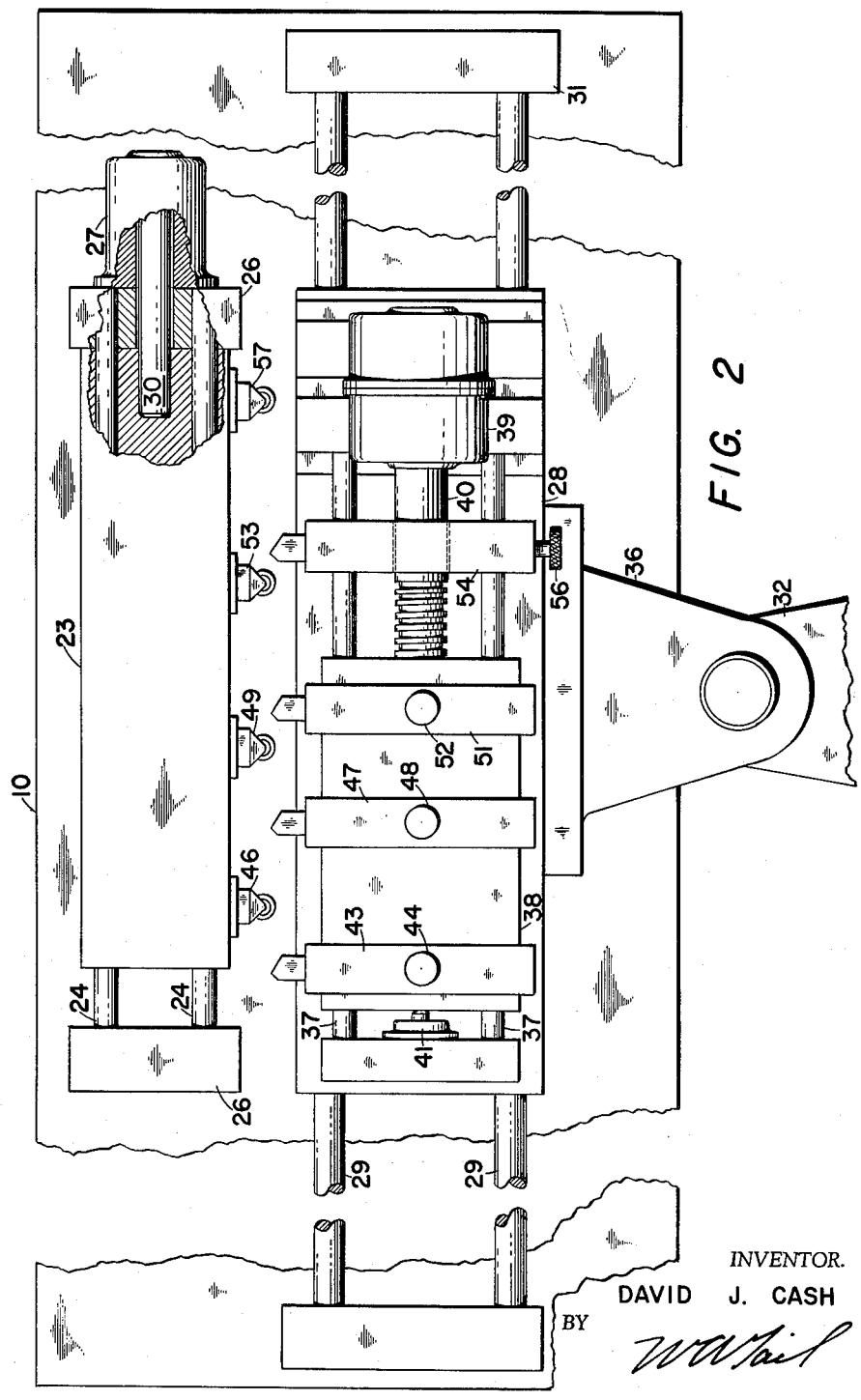

INVENTOR.
DAVID J. CASH
BY
*ATTORNEY*

United States Patent Office 2,988,936
Patented June 20, 1961

2,988,936
PRESSURE WELDING APPARATUS
David J. Cash, Garfield Heights, Ohio, assignor to Cleveland Pneumatic Industries, Inc., Cleveland, Ohio, a corporation of Ohio
Filed Mar. 19, 1958, Ser. No. 722,545
2 Claims. (Cl. 78—84)

This invention relates generally to welding and more particularly to a new and improved pressure welding machine.

It is an important object of this invention to provide a pressure welding machine capable of semi-automatic welding operations which will produce high quality uniform welds.

It is another important object of this invention to provide a thermo-compensated pressure welder wherein the thermo-expansion of the pieces to be welded does not adversely affect the uniformity of the welds.

It is still another object of this invention to provide a pressure welding machine which automatically compensates for variations in the size of the pieces being welded in a particular production run.

It is still another object of this invention to provide a semiautomatic pressure welding machine wherein the initial contact and initial upsetting phases are maintained uniform and the final upset phase of the welding cycle is varied to provide welded pieces of a uniform length regardless of the initial size thereof.

Further objects and advantages will appear from the following description and drawings, wherein:

FIGURE 2 is a plan view of the cam station of the control for the pressure welder illustrating the mechanism utilized to compensate for the dimensional tolerances of the pieces to be welded;

In general, pressure welding takes place in three steps, or phases, the first of which includes the phase wherein the two work pieces to be welded are brought together and heated under pressure to place the engaging surfaces in intimate contact. This phase continues as the work pieces are heated to a temperature where softening of the material takes place and upsetting is initiated. Normally, in the second phase, the pressure exerted to press the pieces together is reduced while the pieces are heated to welding temperatures and it is in this phase that the welding is performed and an inter-metallic bond is established between the work pieces. In the third, or final phase, high pressures are again exerted in the work pieces to upset them and bring the final welded piece to a desired dimension and improve the metallurgical properties of the weld. It should be understood that, although most pressure welding follows this three-phase procedure wherein the pressure is high in the first phase, reduced in the second phase, and increased in the third phase, some types of metals require different programming of the machine to meet the particular welding properties of the material. Therefore, the discussion which follows is related to a typical welding operation but a machine, according to this invention, could be adjusted or modified without departing from the invention to operate in any desired manner dictated by the metallurgical properties of the pieces to be welded.

Figure 1:
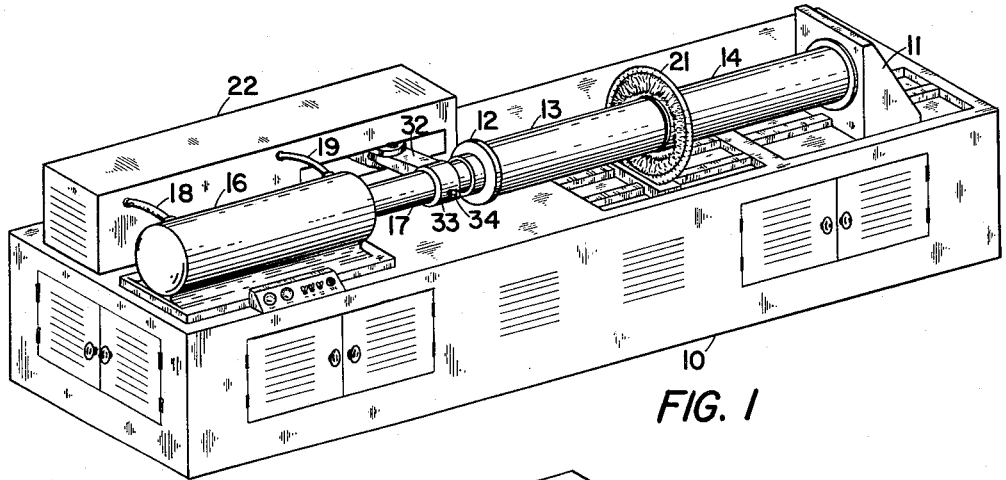
FIGURE 1 is a perspective view of a pressure welder incorporating this invention schematically illustrating the basic components of a pressure welding machine.

Referring to the drawings, FIGURE 1 illustrates the basic components of the pressure welding machine and is not meant to illustrate all of the various refinements utilized in a complete modern machine. The pressure welder includes a base, or frame 10, on which is mounted a fixed platen 11 which can be adjusted relative to the frame but is locked against movement during welding operations. A movable platen 12 is axially movable relative to the frame and the fixed platen 11, and is arranged so that work pieces to be welded 13 and 14 can be clamped between the two platens during the welding operation. In order to move the movable platen 12, I utilize a fluid motor including a cylinder 16 mounted on the frame 10 and a cooperating piston 17. The cylinder 16 is provided with fluid pressure lines 18 and 19 at its ends through which pressure fluid can be supplied to the cylinders. When the left end of the cylinder 16 is pressurized through the pressure line 18 and the right end of the cylinder is connected to the reservoir return through the line 19, the piston 17 is urged to the right to clamp the work pieces 13 and 14 between the two platens 11 and 12. Conversely, if the opposite fluid connections are made, the piston 17 is moved to the left to release the work pieces 13 and 14. To heat the work pieces to welding temperatures, a torch ring 21 carried by the frame 10, is positioned around the work pieces. The control mechanism for the welding machine, which is the primary subject of this invention, is preferably located in a control enclosure 22 carried by the frame 10.

Figure 3:
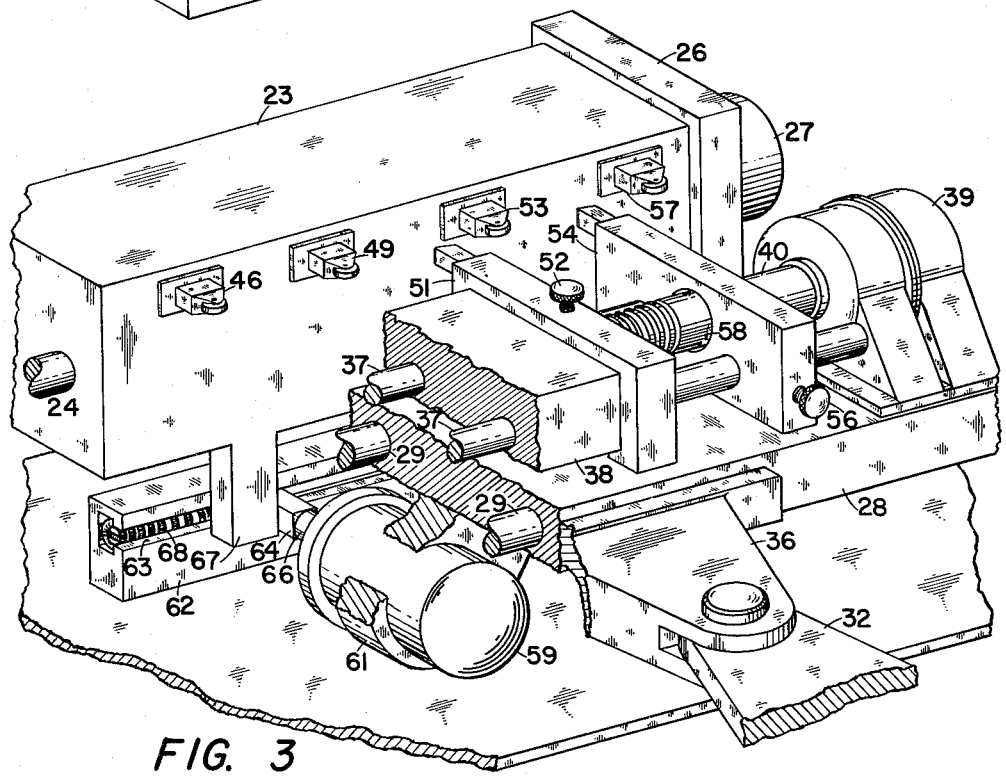
FIGURE 3 is a fragmentary perspective view illustrating the structure shown in FIGURE 2 with emphasis on the mechanism utilized to automatically compensate for thermo-expansion of the pieces to be welded.

Referring now to FIGURES 2 and 3, the controls for the machine include a switch block 23 which is axially movable along guide rods 24 for movement parallel to the movement of the piston 17. The guide rods 24 are, in turn, supported on mounting blocks 26 carried by the frame 10. The switch block 23 is axially movable from the first position shown in FIGURE 2 wherein it is at the right extreme of its travel and is abutting the right-hand mounting block 26. To move the switch block 23 to the right-hand, or first position, I utilize an electric solenoid 27 mounted on the right-hand mounting block 26 which is provided with an armature 30 connected to the switch block 23. A movable carriage 28 is supported by guide rods 29 which are in turn mounted on mounting blocks 31 secured to the frame 10. The movable carriage 28 is also movable relative to the frame in a direction parallel to the direction of the movement of the piston 17 and is connected to the piston 17 by a carrier bar 32 so that it moves with the piston. Referring to FIGURE 1, the carrier bar 32 is provided with a sleeve 33 through which the piston rod 17 projects and a set screw 34 which locks the sleeve and carrier bar to the piston 17. Referring again to FIGURE 2, the carrier bar 32 is pinned to a lug 36 which is mounted on the movable carriage 28. Because of the connection between the movable carriage 28 and the piston 17, the movable carriage is always in a predetermined position relative to the piston once the set screw 34 is tightened. However, major adjustments may be made during the setup of the machine by loosening the set screw 34 and moving the sleeve 33 along the piston 17.

Mounted on the movable carriage 28 are additional guide rods 37 on which an adjusting cam block 38 is movable in a direction parallel to the direction of movement of the piston 17. An electric motor 39, mounted on the movable carriage 28, is provided with a rotatable screw 40 which threads into the end of the cam block 38 and connects the cam block 38 to the motor so that rotation of the motor 39 adjusts the cam block 38 axially relative to the movable carriage 28. When the welding cycle is initiated as discussed below, the cam block 38 is positioned in its left extreme position against a limit switch 41 carried by a left-hand mounting block 42 which is utilized to support the guide rods 37 on the movable carriage 28. To adjust for variations in sizes of the work pieces, the motor 39 is operated to move the cam block 38 to the right along the guide rods 37 from the position shown in FIGURE 2.

Mounted on the cam block 38 is a first cam 43 which is fixed against movement relative thereto by a set screw 44 and is proportioned to engage and operate a first switch 46 mounted on the switch block 23. A second cam 47 is locked on the cam block 38 by a set screw 48 and is proportioned to engage and operate a second switch 49 mounted on the switch block 23, and a third cam 51 is locked on the cam block 38 by a set screw 52 and is proportioned to engage a third switch 53 carried by the switch block 23. Those skilled in the art will recognize that the three cams, 43, 47, and 51, will move as a unit with the cam block 38 once they are adjusted and locked in the desired positions, and it is these three cams which are used to control the first two phases of the welding operation as will be discussed below. A fourth cam 54 mounted on the guide rods 37 is secured against movement relative thereto by a set screw 56 and is proportioned to engage and operate a fourth switch 57. Because the fourth cam 54 is mounted on the guide rods 37, it is movable with the movable carriage 28 and it is not affected by the axial movement of the cam block 38 relative to the movable carriage 38. It is this cam which operates the switch 57 to shut the machine off at the completion of the welding operation. As shown in FIGURE 3, the fourth cam is formed with a clearance hole 58 through which the screw 40 projects.

To provide for automatic compensation for the expansion of the work pieces during the initial heating, I utilize a one-way clutch shown in FIGURE 3. The clutch includes a clutch solenoid 59 mounted on a bracket 61, on the movable carriage 28, and a guide member 62 formed with a T-slot 63, mounted on the frame 10. Positioned in the T-slot 63 for axial movement relative to the guide member 62 is a T-slide 64. The end of the T-slide 64 is proportioned to be adjacent to the armature 66 of the solenoid 59 so that when the clutch solenoid 59 is energized, the T-slide 64 engages the end of the armature 66 and is locked against movement relative to the clutch solenoid. The switch block 23 is formed with a depending projection 67 positioned to one side of the T-slide 64 for engagement thereby. A light coil spring 68 is anchored, at its left end, to the guide member 63 and connected at its right end to the T-slide 64 and normally maintains the T-slide 64 in engagement with the projection 67. Thus, before the clutch solenoid 59 is energized, the T-slide 64 is always in engagement with the projection 67. Once the clutch solenoid 59 is energized, the T-slide 64 is locked against movement relative thereto so if the movable carriage 28 moves to the left, under the influence of the expansion of the work pieces 13 and 14, it will move the T-slide 64 and, in turn, the switch block 23, maintaining the relative position between the movable carriage 28 and the switch block 23, which exists at the time the clutch solenoid 59 is energized. However, as the work pieces are upset during the welding phase causing movement of the movable carriage 28 to the right, the switch block 23 remains in whatever position it is in at the time the movable carriage 28 starts to move to the right. Since the clutch is magnetic in operation, it is necessary to form the guide member 62 and the switch block 23 of a non-magnetic material, such as stainless steel or aluminum. However, the T-slide 64 should be formed of a magnetic material so that it will be clamped against the armature 66 when the solenoid is energized.

Figure 4:
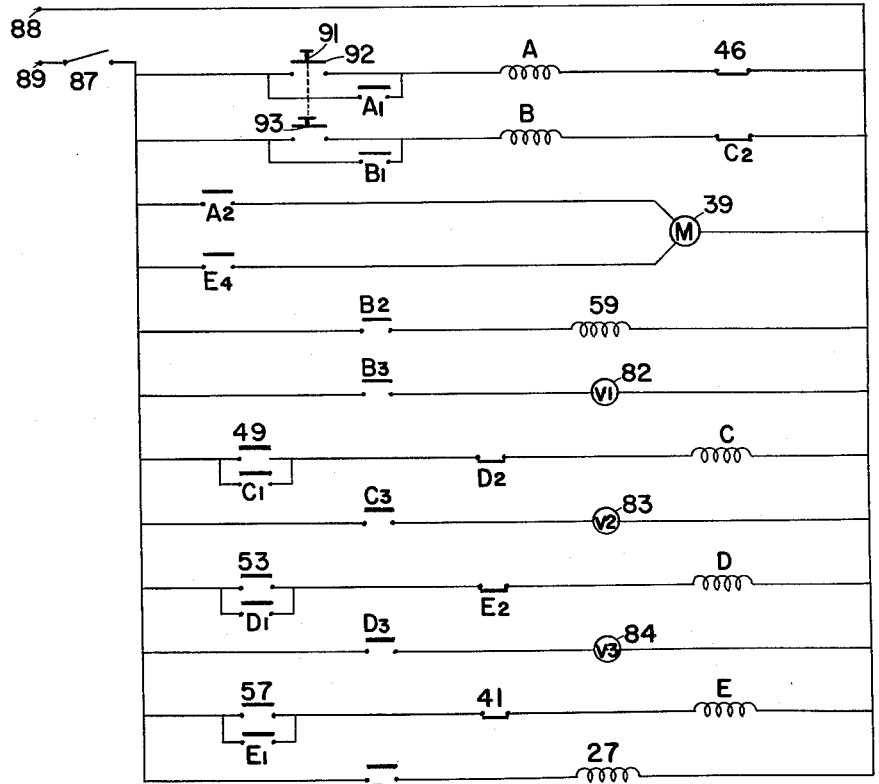
FIGURE 4 is a line to line schematic of the electrical circuit for controlling the welding machine; and, FIGURE 5 is a schematic diagram of the hydraulic system which is operated by the electrical control and which in turn operates the pressure welder.
Figure 5:
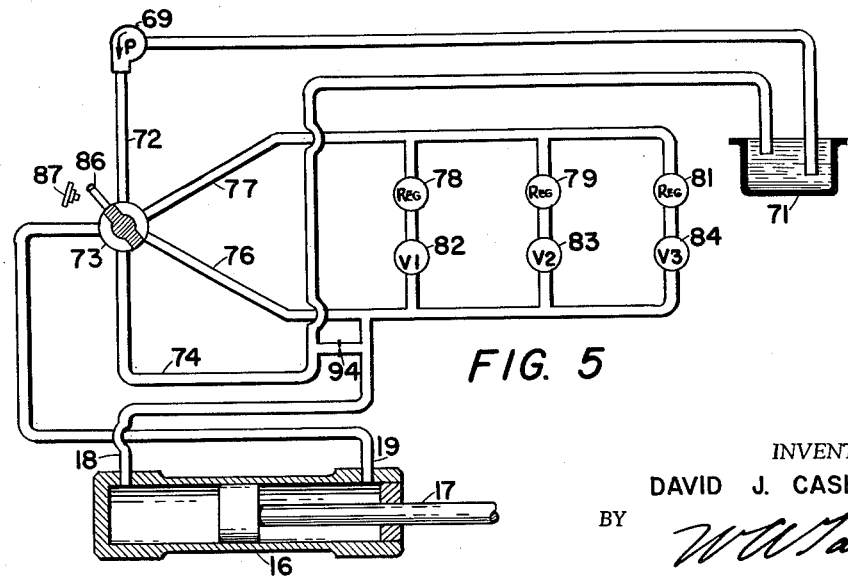

Reference should now be made to FIGURES 4 and 5 wherein the electrical and hydraulic systems are schematically shown. Referring to FIGURE 5, a pump 69 is connected to a reservoir 71 and is provided with an output pressure line 72 connected to a manual control valve 73. The fluid pressure line 19 is directly connected to the manual control valve 73 and the pressure line 18 is connected to the valve 73 through a pressure line 76. The manual valve 73 is arranged so that if the manual control valve 73 is in the clamping position shown in FIGURE 5, fluid under pressure is supplied to the left end of the cylinder 16 through the fluid connection 18 and the right end of the cylinder 16 is connected to the reservoir 71 through the fluid connection line 19 and a reservoir return line 74. This condition operates to provide full pressure for extending the piston 17 for clamping the work pieces 13 and 14 prior to the welding operation. If the valve 73 is rotated in a clockwise direction through approximately 90° to a backing position, the pressure line 72 is connected to the fluid line 19 and the fluid line 18 is connected to the reservoir return 74 which causes the piston 17 to move to the left in the cylinder 16 to release the work pieces 13 and 14. This is again manual operation for removing the work pieces that have been welded or for providing clearance to insert new work pieces to be welded. Normally, the work pieces are positioned between the two platens 11 and 12 and the manual valve 73 is operated to the clamping position of FIGURE 5. The manual valve is then turned in a counterclockwise direction to an automatic position wherein it isolates the pressure line 76 from both the reservoir return 74 and the pressure line 72. In this position, the supply pressure through the line 72 is connected to a fluid conduit 77 and the reservoir return 74 is connected to the fluid line 19.

In the illustrated embodiment there are three pressure regulators 78, 79, and 81 connected to the fluid conduit 77. The pressure regulator 78 is adjusted to provide the desired fluid pressure for the first phase of the welding cycle, the second pressure regulator 79 is adjusted to provide the proper fluid pressure for the second phase of the welding cycle, and the third pressure regulator 81 is adjusted to provide the proper pressure for the final or upset phase of the welding cycle. The output side of the pressure regulator 78 is connected to an electrically operated, normally closed valve 82 which in turn connects to the pressure line 18, the output side of the pressure regulator 79 is connected to a normally closed electrically operated valve 83 which also connects to the pressure line 18 and the output side of the pressure regulator 81 connects to a normally closed, electrically operated valve 84 which also connects to the pressure line 18. Thus, the supply pressure from the pump 69 is isolated from the left end of the cylinder 16 when the manual valve 73 is moved in a counterclockwise direction to the automatic position but the operation of any of the valves 82 thru 84 can selectively supply the desired pressure through their associated pressure regulators 78, 79, and 81. Preferably, the manual valve 73 is provided with a projection 86 which engages and closes a normally open switch 87 when the manual valve is moved to the automatic position.

Referring now to FIGURE 4, a line to line schematic of the electric control circuit is shown wherein line voltage is applied between the points 88 and 89. The normally open switch 87 is connected between the source of power and the remainder of the control circuit normally de-energizing the circuit excepting when the manual valve 73 is in the automatic position at which time the switch 87 is closed and the control circuit is powered. At the beginning of a welding cycle, the switch block 23 is in its right-hand position shown in FIGURES 2 and 3, and the cam block 38 is in its left-hand position shown in FIGURE 2. After the work pieces 13 and 14 are clamped, the manual valve 73 is turned to the automatic position closing the switch 87 and energizing the control circuit. The start button 91 is then pressed, closing the two normally open switches 92 and 93. This energizes the coils of a relay A and a relay B. When the coil of the relay A is energized, a normally open interlock A1 is closed to provide a parallel path around the switch 92 to operate as a holding circuit. The relay B is also provided with a normally open interlock B1 which operates as a holding circuit around the switch 93. The relay A is provided with a normally open interlock A2 in the circuit of the motor 39 which is arranged to operate the motor 39 in a direction which causes the screw 40 to move the cam block 38 to the right from the position of FIGURE 2 when the relay A is energized. The motor 39 continues to move the cam block to the right until the cam 43 engages and opens the switch 46 which in turn de-energizes the coil of the relay A and opens the interlocks A1 and A2. Therefore, the motor 39 stops when the cam 43 engages the switch 46 and the cam block 38 is automatically moved to a predetermined position relative to the switch block at the beginning of each welding cycle.

The relay B is provided with a normally open interlock B2, which is closed when the relay B is energized, to energize the clutch solenoid 59. Therefore, when the start button 91 is pressed, the clutch solenoid 59 is energized to engage the clutch connecting the movable carriage 28 and the switch block 23. The torch ring is, of course, lit at the same time so the two work pieces 13 and 14 are being heated adjacent to the welding zone. This heating causes the two work pieces 13 and 14 to expand, moving the piston 17 to the left. The operation of the clutch solenoid 59 insures that the switch block 23 and the movable carriage 28 will be maintained in the relative position which exists when the work pieces are initially clamped during the movement of the piston 17 due to thermo-expansion. The solenoid B also is provided with an interlock B3, which is closed when the solenoid B is energized to operate the valve 82 which supplies pressure to the left end of the cylinder 16 from the pressure regulator 78. Therefore, during the first phase of the welding operation, while the work pieces are being heated, fluid is supplied to the cylinder 16 at a first predetermined pressure which is the pressure at which the pressure regulator 78 is set. To prevent the building up of pressure in the cylinder 16 as the piston is moved to the left I provide a restricted bleed 94 connecting the two pressure lines 18 and 19. Such a bleed insures that make-up fluid will have to be supplied to the cylinders so proper pressure regulation will be provided. As the work pieces reach a softening temperature, this pressure causes the initial upset of the work pieces so the piston 17 starts to move to the right.

As the piston 17 moves to the right, it carries with it the movable carriage 28 until the cam 47 engages and closes the switch 49. This energizes the coil of a solenoid C which closes a hold interlock C1. At the same time, a normally closed interlock C2 is open which in turn de-energizes the relay B opening the holding interlock B1. The interlock B2 also opens to de-energize the clutch solenoid 59 and the interlock B3 opens and permits the valve 82 to close. The solenoid C is provided with a normally open interlock C3 which opens the valve 83 so that the pressure regulator 79 is connected to the left end of the cylinder 16 to supply a second predetermined pressure to the cylinder. Usually, the pressure of the second pressure regulator 79 is substantially less than the pressure of the first pressure regulator 78 so that the work pieces will be permitted to slowly heat to a proper welding temperature as they are slowly upset by the force of the piston 17.

The pressure supplied to the cylinder 16 causes the piston 17 to continue to move to the right until the cam 51 engages and closes the switch 53 at the end of the second phase of the welding operation. Closing of the switch 53 energizes the coil of a relay D which is, in turn, provided with a holding interlock D1. A normally closed interlock D2 is opened at this time to de-energize the relay C. When the relay C is de-energized, of course, the valve 83 is closed, isolating the pressure regulator 79 from the cylinder 16. The relay D is provided with a normally open interlock D3 which is closed when the relay D is energized and operates to open the valve 84. Therefore, the pressure regulator 81 is brought into fluid communication with the left-hand of the cylinder 16 for the third and final phase of the welding cycle. It is at this time that the major portion of the upsetting takes place to improve the properties of the weld and to establish final dimension of the welded work pieces 13 and 14. Therefore, the pressure regulator 81 is normally set at a relatively high pressure to cause rapid upsetting of the work pieces. Those skilled in the art of pressure welding will recognize that the weld is substantially completed before the upsetting phase so the torch is extinguished during the rapid upsetting of the work pieces.

The upsetting is caused by movement of the piston 17 to the right so the cam 54 engages and closes the switch 57 when this phase is completed. When the switch 57 is closed, the coil of relay E is energized, which closes a normally open holding interlock E1, connected in parallel to the switch 57, and opens a normally closed interlock E2 to de-energize the relay D and cause the valve 84 to be closed. The welding operation is completed so no pressure is supplied to the cylinder 16. A normally open interlock E3 is closed when the relay E is energized and is connected to energize the solenoid 27 which, in turn, moves the switch block 23 back to its right-hand extreme position against the mounting block 26. At the same time, a normally open interlock E4 is closed and the motor 39 is energized to turn the screw 40 in a direction causing the cam block 38 to move to the left relative to the movable carriage 28 until it engages the limit switch 41 at its left extreme position relative to the movable carriage 28.

When the limit switch 41 is opened by engagement with the cam block 38, the relay E is de-energized and the machine is ready for the next welding cycle. It is merely necessary then to move the manual valve 73 to the backing position to cause the piston 17 to move to the left, thus releasing the welded work pieces.

Those skilled in the art will recognize that a pressure welding machine incorporating this invention provides automatic compensation to adjust for the expansion of the work pieces during the initial heating phase and also provides automatic compensation for differences in the initial length of the work pieces of a particular welding run. To compensate for the expansion of the work pieces during the initial heating, the clutch solenoid 59 maintains the movable carriage 28 and the switch block 23 in a predetermined position as the pieces expand due to heating. This predetermined position determines the final length of the work pieces at the completion of the welding cycle since the cam 54 is mounted on the movable carriage 28. Automatic compensation for differences in the initial dimensions of the work pieces is accomplished by the adjustment of the cam block 38 during each welding cycle. It should be noted that the motor 39 operates to move the cam 43 into engagement with the switch 46 during the initial heating of the work pieces, so that the two cams 47 and 51 will have a predetermined spacing from their associated switches 49 and 53 regardless of the dimensional differences in the work pieces.

Those skilled in the art will recognize that it is desirable to maintain the first two phases of the welding operation uniform so that a uniform weld will be achieved in each case. During the first phase, the initial upsetting takes place at a fairly high pressure while the work pieces are being heated to softening temperatures. Because the cam 47 is always in a predetermined position relative to the switch 49 when the welding operation is started, the first phase of the welding cycle will be terminated when a predetermined amount of upset has taken place. The actual welding of the two work pieces is accomplished during the second phase of the welding cycle wherein the temperature at the weld plane is brought up to welding temperatures. Because the cam 51 is always spaced from the switch 53 by a predetermined amount at the beginning of the second phase, a predetermined amount of upsetting will take place during the second phase of the welding operation regardless of the dimensional tolerances of the work pieces. Because a predetermined amount of upsetting will take place, a uniform weld will be produced each time the machine is operated. The amount of upsetting in the third phase varies with different sizes of work pieces in a production run so that the final welded work pieces will have the desired length. Therefore, the cam 54 is on the movable carriage and causes the pieces to be upset to the desired cold length of the welded work pieces plus the expansion length of heating. Of course, as the pieces cool to room temperature, they contract back to the desired final dimension.

It should be understood that the illustrated embodiment of this invention, wherein there are three phases of operation, could be modified by adding additional cams and switches to increase the number of welding phases if the metallurgical properties of the work pieces require such additional welding phases. Those skilled in the art will recognize, however, that a pressure welder incorporating this invention automatically compensates for both dimensional tolerances for work pieces and the expansion of the work pieces during the heating thereof, so that uniform welds will be produced once the cams are set for a particular production run.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims, and not the aforesaid detailed description, are determinative of the scope of the invention.

I claim:

1. A pressure welder comprising a frame, a pair of opposed platens on said frame adapted to receive work pieces to be welded and upset such pieces during welding, said work pieces being subject to thermo-expansion by welding heat, a fluid motor including a ram connected to one of said platens movable in a first direction under the influence of said fluid motor to move said platens toward each other to create a weld and movable in a second direction under the influence of the thermal expansion of said workpieces opposite to said first direction to separate said platens, a first member on said frame, said first member carrying welding cycle control and being movable from a first position in said second direction, a second member connected to said ram for movement therewith in both of said directions, a source of fluid pressure, a clutch operable to connect said first member to said second member for movement thereby only in said second direction, the extent of the thermal expansion of said workpieces to position the controls of said first member in proper relation to the thermal expansion of said workpieces, and means cooperating with the controls of said first member to connect said source and motor for creating a welding cycle governed in accordance with the setting of said first member.

2. The structure of claim 1 whereby said controls include a plurality of spaced valve mechanisms fixed in position on one of said members, said means including a valve actuator fixed in spaced relation on the other of said members, and the terminal valve mechanism and valve actuator upon engagement terminating the welding cycle, whereby the extent of upset is determined by movement of the platen in accordance with the relative position of said valve mechanism and actuator which relative position is initially modified by the thermal expansion of the particular metal being welded.

References Cited in the file of this patent

UNITED STATES PATENTS

| | | |
|---|---|---|
| 2,001,902 | Engelbertz | May 21, 1935 |
| 2,193,490 | Rehse | Mar. 12, 1940 |
| 2,392,824 | Lytle | Jan. 15, 1946 |
| 2,544,749 | Cowie | Mar. 13, 1951 |
| 2,545,570 | Caldwell | Mar. 20, 1951 |
| 2,566,670 | Lewis | Sept. 4, 1951 |
| 2,569,226 | Carter | Sept. 25, 1951 |
| 2,585,266 | Murry et al. | Feb. 12, 1952 |
| 2,586,943 | Haller | Feb. 26, 1952 |
| 2,684,603 | Schonberg | July 27, 1954 |
| 2,724,035 | Seeloff | Nov. 15, 1955 |